United States Patent
Carlsson et al.

(10) Patent No.: US 8,224,809 B2
(45) Date of Patent: Jul. 17, 2012

(54) SYSTEM AND METHOD FOR MATCHING ENTITIES

(75) Inventors: Richard Carlsson, Stockholm (SE); Olof Lundström, Beijing (CN); Gerardo Montero Arizmendi, Stockholm (SE); Hjalmar Olsson, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/132,201

(22) PCT Filed: Dec. 2, 2008

(86) PCT No.: PCT/EP2008/066617
§ 371 (c)(1), (2), (4) Date: Jun. 1, 2011

(87) PCT Pub. No.: WO2010/063311
PCT Pub. Date: Jun. 10, 2010

(65) Prior Publication Data
US 2011/0238694 A1    Sep. 29, 2011

(51) Int. Cl.
*G06F 17/30* (2006.01)
(52) U.S. Cl. ........................................... 707/715
(58) Field of Classification Search .......... 707/705–723, 707/764–770, 781–788
See application file for complete search history.

(56) References Cited

U.S. PATENT DOCUMENTS

| | | | |
|---|---|---|---|
| 7,664,734 B2* | 2/2010 | Lawrence et al. | 707/767 |
| 2010/0241595 A1* | 9/2010 | Felsher | 705/400 |
| 2011/0043652 A1* | 2/2011 | King et al. | 348/222.1 |

OTHER PUBLICATIONS

International Search Report for PCT/EP2008/066617, dated Mar. 11, 2009.
International Preliminary Report on Patentability for PCT/EP2008/066617 dated Mar. 17, 2011.
Written Opinion, PCT/EP2008/066617, Nov. 3, 2009.
Garcia-Molina H. et al., "Database System Implementation," 2000, Prentice Hall, Inc., Upper Saddle River, New Jersey.
Nelson M.J., "A prefix trie index for inverted files," Information Processing & anagement, Elsevier, Barking, GB, vol. 33, No. 6, Nov. 1, 1997, pp. 739-744.
Ramesh R. et al., "Variable-Depth Trie Index Optimization: Theory and Experimental Results," ACM Transactions on Database Systems, ACM, New York, NY, vol. 14, No. 1, Mar. 1, 1989, pp. 41-74.

* cited by examiner

*Primary Examiner* — Wilson Lee
(74) *Attorney, Agent, or Firm* — Myers Bigel Sibley & Sajovec (57) ABSTRACT

Matching systems are provided that are configured to determine if a first entity received from a client device of a first user matches with at least one other entity of a plurality of entities indexed in an index in which each entity is associated with one or more index points. The system includes an application server adapted for communication with a matching engine and the client device. The matching engine is configured to index the first entity by associating the first entity with one or more index points in the index; and search for other entities matching the first entity among the plurality of entities indexed in the index by searching for other entities associated with at least one of the index points with which the first entity is associated. The matching system is adapted to initiate the search for other entities matching the first entity upon occurrence of a match triggering event and interpret the reception of the first entity as a match triggering event such that search is initiated upon reception thereof.

18 Claims, 8 Drawing Sheets

Fig. 9

SYSTEM AND METHOD FOR MATCHING ENTITIES

CROSS-REFERENCE TO RELATED APPLICATION

This application is a 35 U.S.C. §371 national stage application of PCT International Application No. PCT/EP2008/066617, filed on Dec. 2, 2008, the disclosure and content of which is incorporated by reference herein as if set forth in its entirety. The above-referenced PCT International Application was published in the English language as International Publication No. WO 2010/063311 on Jun. 10, 2010.

FIELD

The invention relates to the field of data acquisition and analysis, and in particular to a method and system for determining whether an entity received by a matching system matches previously received entities.

BACKGROUND

During the last 5-10 years, "Search" has become a phenomenon in the digital world among people all around the globe. In a typical search situation, a short search query is used to find a large, or at least a larger, document. Typical examples are Internet search engines or search engines installed on library computers for searching articles or books stored in the library.

A traditional search scenario, as described above, is different from a typical match scenario. In a match scenario, two or more users input data into a system for the purpose of finding out whether the data matches the data input by the other user(s). That is, as opposed to a search scenario, all users inputting information into the system are interested in finding matching information. In a search scenario, only the user entering the search query, typically in form of one or several key words, is interested in the match result. From a technical point of view, a matching system differs from a search engine at least in that a matching system has to index the incoming "queries" since the queries are also potential matches for previously or subsequently received queries. In order to distinguish a "match query" from a conventional search query, the data transmitted to a matching system in a "match query" will throughout this document be referred to as an "entity".

A matching system can be used in many different types of matching services. Examples of such services are online job finding/recruitment services, E-commerce services and dating services.

In existing matching systems, a match operation can be said to be divided into at least two sub-operations; an insertion operation and a search operation. First, when a new user sends an entity to the system, the insertion operation in which the entity is inserted to the data structure of the system is performed. This operation involves the step of making the entity searchable to other users by indexing the entity into an index in which it is associated with index points to facilitate fast and accurate retrieval of entities. Then, at a later stage, the search operation in which the system searches for matching entities is performed. The search operation is initiated by some event occurring within the system. Such an event may hence be considered a "match triggering event". In existing matching systems, a match triggering event may be, e.g., the occurrence of a user pressing a "search-for-matching-jobs-button" displayed to the user in his/her web browser when visiting a job-finding web site, or the expiration of a timer running in a server hosting the job-finding application. In order to see if new matches have been added to the system after the last occurrence of a match triggering event, the user has to wait for the next one to occur, i.e., in this exemplary case, to wait for the timer to expire or press the search button again. How and when a matching system performs searches for potential matches is crucial to the perceived quality of a match service. Also, in between the occurrences of match triggering events there is a risk that the matching system is in an "unmatched state", meaning that the system may be unaware of that different entities stored in the system match each other. Of course, this is an undesired state of a matching system since users cannot be notified about matching entities as long as the system is unaware of their existence. This fact often reduces the user-perceived quality of the service for which the matching system is used.

How and when a matching system performs searches for potential matches is also crucial to the computational power required by the matching system. In existing systems, the index has to be traversed at least twice during a matching operation; once during the insertion operation when indexing the entity and once during the search operation when traversing the index in pursuit of matching entities. Since the index of a typical matching system comprises a vast amount of data this process is often slow and computational power consuming.

Thus, one problem associated with matching systems according to prior art is how to increase the user-perceived quality of the matching service for which the system is used. Another problem is how to reduce the computational capacity needed in the matching systems. Yet another problem is how to reduce the time needed to find all potential matches in the system.

SUMMARY

It is an object of the invention to solve or at least mitigate at least one of the above discussed problems for matching systems.

This object is achieved by a matching system capable of determining if a first entity received from a client device of a first user matches with at least one of a plurality of entities indexed in an index in which each entity is associated with one or more index points. The matching system comprises an application server, such as a Java EE Application Server, which is adapted for communication with a matching engine and the client device. The matching engine is adapted to index the first entity by associating it with one or more index points in the index, and to search for entities matching the first entity among the plurality of entities indexed in the index by searching for entities associated with at least one of the index points with which the first entity is associated. The matching system is adapted to initiate the search for entities matching the first entity upon occurrence of what is herein referred to as a match triggering event. The matching system is adapted to interpret the reception of the first entity as such a match triggering event. Thereby, the matching system is adapted to initiate the search upon reception of the first entity.

As mentioned in the background portion, the term "entity" is herein used to distinguish the data transmitted to a matching system in a "match query" from the data sent to a conventional search engine in a search query. That an entity matches another entity herein means that the entities have at least one index point in common, i.e. that there is at least one index point in the index with which both entities are associated. An index point may be any symbol (such as a character) or sequence of symbols (such as a word) corresponding to a symbol or sequence of symbols found within the entity/entities associated with that index point, or a symbol or sequence of symbols reflecting one or several properties of the entity/entities associated therewith. An entity may be, e.g., a text file, an image file, an audio file or any other type of data having properties that can be "translated" to words or other sequences of symbols which can serve as index points that are characterizing of the entities associated therewith. The index used by the matching system may be any type of search engine/match engine index known in the art. What type of index to use and how to structure and store the index data may vary to meet different design factors, e.g. to suit the matching service for which the system is used and the entity type used in that service.

By interpreting reception of a new entity as a match triggering event and thus perform a search for matching entities directly upon reception of a new entity, the matching system is continuously kept in a "matched state", meaning that the system is always aware of all matches between all entities stored in the system. This feature has the effect of allowing the matching system to automatically notify a user about a new entity that matches his/her entity directly when such a matching entity is received by the system. Compared to the matching systems according to prior art described in the background portion, this is advantageous in that a user does not have to wait for the next time-determined search operation to take place, as is the case in matching systems implementing time-triggered search operations, or re-press the "search-for-matches-button", as is the case in matching systems implementing click-triggered search operations, in order to find out whether new entities matching his/her entity have been submitted to the matching system after the previous search operation was performed. From a system perspective, the feature is advantageous in that it reduces the computational power required by the matching system since searches do not ever have to be performed unless a new entity has been received by the system since the last search operation was performed. Thus, the suggested principle ensures that no redundancy searches on already searched entities are performed. In the above described matching systems according to prior art, a search operation and thus a time and computational power consuming traversal of the index may be performed although no new entities have been submitted to the system after the last search operation was performed.

Preferably, the search for entities matching the first entity and indexation of the first entity is performed in one single operation such that the matching system only has to traverse the index once for each matching operation. This may be achieved by adapting the matching system to, for each index point in the index with which the first entity is to be associated, both associate the first entity with that index point and retrieve information identifying other entities that are associated with that index point. Association of an entity with an index point is typically achieved by storing an entity identification parameter uniquely identifying the entity in that index point of the index. Thus, in this case, when storing the entity identification parameter of the first entity in an index point with which the first entity is to be associated, the entity identification parameters already stored therein can be retrieved at the same time at no extra cost. Since indices in matching systems typically stores a vast amount of data in complex data structures, the feature of performing both indexation and search in one single traversal of the index reduces the computational power required by the matching system and/or the time required for performing each matching operation, i.e. the time required for indexing a new entity and search for entities matching the new entity.

More advantageous features of the matching system according to the invention will be described in the detailed description following hereinafter and in the appended claims.

The invention also relates to a method for determining if a first entity received from a client device of a first user matches with at least one of a plurality of entities indexed in an index in which each entity is associated with one or more index points, as specified in claim 9, and a computer program for causing a server node to perform this method, as specified in claim 17. Furthermore, the invention relates to a computer program product comprising a storage medium on which such a computer program product is stored.

BRIEF DESCRIPTION OF THE DRAWINGS

The objects, advantages and effects as well as features of the invention will be more readily understood from the following detailed description of exemplary embodiments of the invention when read together with the accompanying drawings, in which.

DETAILED DESCRIPTION

While the invention covers various modifications and alternative constructions, embodiments of the invention are shown in the drawings and will hereinafter be described in detail. However it is to be understood that the specific description and drawings are not intended to limit the invention to the specific forms disclosed. On the contrary, it is intended that the scope of the claimed invention includes all modifications and alternative constructions thereof falling within the scope of the invention as expressed in the appended claims.

Figure 1:
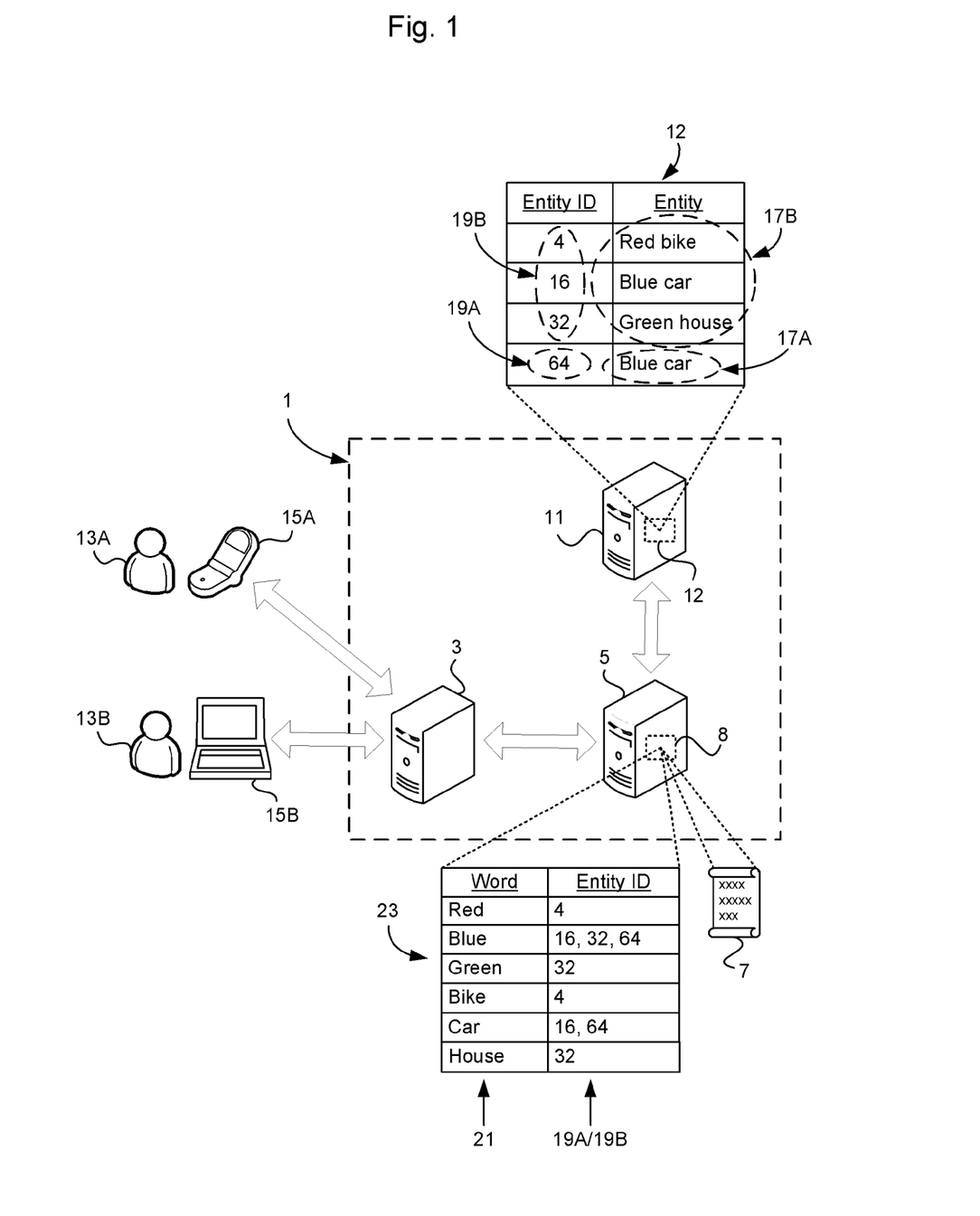
FIG. 1 illustrates an exemplary matching system for determining whether entities received by the system matches previously received entities.

FIG. 1 illustrates an exemplary matching system 1 according to the invention. The matching system 1 is adapted to determine whether entities 17A, 17B received from client devices 15A, 15B of different users 13A, 13B matches each other. The matching system 1 comprises a web server 3, an application server 5 and a database server 11 which are communicatively connected in order to exchange data as illustrated by the bidirectional arrows in the drawing.

The users 13A, 13B typically access a matching service hosted by the matching system 1 over the Internet via a web browser in their client devices 15A, 15B. The web server 3 is responsible for handling the communication with the client devices 15A, 15B and for rendering a nice and functional user interface. Typically, this is achieved by constructing and delivering XHTML (Extensible HyperText Markup Language)/HTML web pages to the client devices 15A, 15B.

The application server 5 is the part of the system that is responsible for execution of the software-implemented matching service. The application server 5 comprises a matching function, hereinafter referred to as a matching engine 7, which comprises all functionality needed to determine whether entities 17A, 17B received from one or several client devices 13A, 13B matches each other. The matching engine 7 is here implemented as a computer program which is stored in a computer readable medium 8, such as a hard disk drive, a ROM (Read-only memory), a flash memory or an EEPROM (Electrically Erasable Programmable Read-Only Memory), in the application server 5. When the computer program 6 is run on a processor in the application server 5, it causes the application server 5 to perform the matching operation according to the invention, which matching operation will be described in more detail below. The application server 5 may be, e.g., a Java EE (Enterprise Edition) Application Server.

The database server 11 comprises a database 12, such as a SQL (Structured Query Language) database, which stores all entities received by the matching system 1. When a new entity is stored in the database 12, it is assigned an entity identification parameter 19A, 19B uniquely identifying that entity. The database 12 thus functions as an entity storage and the entity identification parameters 19A, 19B are the keys to find the entities in the entity storage. The entity identification parameters 19A, 19B will hereinafter be referred to as Entity IDs.

The application server 5 also comprises a matching engine index 23 in which all entities 17A, 17B are indexed to facilitate the search for matching entities. The way the index data is structured and stored may vary to meet different system design factors. For example, the index data may be structured in an ordered tree data structure (sometimes referred to as a "trie"), a binary tree data structure, a hash table or a distributed hash table. In this exemplary embodiment, the entities 19A, 19B are text strings and the index 23 is seen to store a list of the Entity IDs 19A, 19B of the entities 17A, 17B containing each word. In a general matching engine index, each entity is associated with one or more index points. An entity can be said to match another entity, at least to some extent, if they have at least one index point in common, i.e. if they are both associated with at least one common index point. In this exemplary index, each word 21 corresponds to an index point of the index 23. Although the index 23 in this embodiment is stored in the storage means 8 of the application server 5, the index may just as well be stored in another node in the matching system 1, such as a separate "index database server" (not shown) or the database server 11, or in a cache memory of the application server 5. What type of index is used and how the index is stored should not be interpreted as a limiting feature of the matching system 1 according to the invention.

It should be understood that the illustrated matching system architecture is only exemplary and that the matching system 1 can be implemented in many other ways. For example, the web server 3 and/or the database server 11 may be included in the application server 5 such that the entire matching system 1 resides within one single server node, and the client devices 13A, 13B may communicate directly with the application server 5 through, e.g., a Java ME (Micro Edition) application instead of communicating with the application server 5 via the web server 3.

Figure 2:
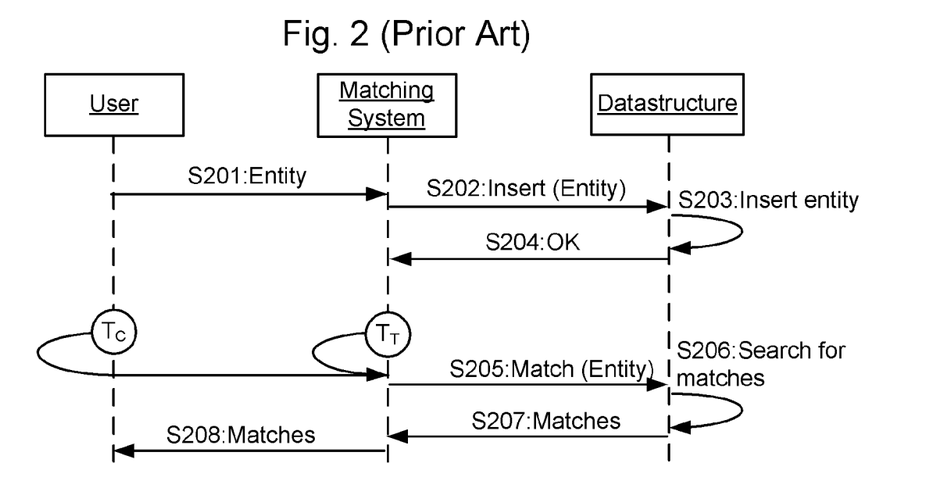
FIG. 2 shows how a matching operation is performed by a typical matching system according to prior art.

FIG. 2 shows how a matching operation is performed by a typical matching system according to prior art.

In a first step S201, a user sends an entity, hereinafter referred to as the new entity, from his/her client device to the matching system. Upon reception of the new entity, the matching system initiates, in step S202, insertion of the new entity into the data structure of the matching system. The insertion operation which involves indexing and typically also storing the new entity is performed in step S203. Indexation is performed by traversing the index of the matching system and associating the new entity with one or more index points to make it searchable to other users. In step S204, the matching system is informed that insertion of the new entity into the data structure was successful. At some later point in time, an event that triggers the matching system to search for entities matching the new entity occurs. As mentioned in the background portion, such an event initiating the search for matching entities may be referred to as a match triggering event. In prior-art matching systems, search may be initiated at a predetermined point in time, in which case the match triggering event typically corresponds to the expiration of a timer running in the server hosting the matching system. The circle denoted $T_T$ (for "Triggered by Timer") indicates the occurrence of such a match triggering event. In other matching systems according to prior art, the search may be initiated by the user who sent the entity by clicking a "search-for-matches-button" displayed to the user in his/her web browser. The circle denoted $T_C$ (for "Triggered by Click") indicates the occurrence of such a click and hence the occurrence of another type of match triggering event. Upon occurrence of the match triggering event $T_T$, $T_C$, the system initiates, in step S205, the search for entities matching the new entity. In step S206, the search is performed by traversing the index again in the pursuit of entities matching the new entity. In step S207, the matching entities, or at least information allowing the matching entities to be identified, are retrieved by the matching system and in step S208, the matching entities are sent to the client device of the user.

The matching operation is thus seen to comprise two separate sub-operations, namely the insertion operation in step S203 and the search operation in step S206. The insertion operation is typically performed directly upon reception of the new entity while the search operation is performed at a later stage, initiated by a match triggering event $T_T$, $T_C$. This means that the user sending the new entity to the matching system has to wait for the match triggering event to occur before finding out whether there are matching entities available, and that the matching system is in an "unmatched state" between insertion of the new entity and the occurrence of the match triggering event, meaning that the matching system is unaware of any potential matches between the new entity and other entities stored in the matching system.

Figure 3:
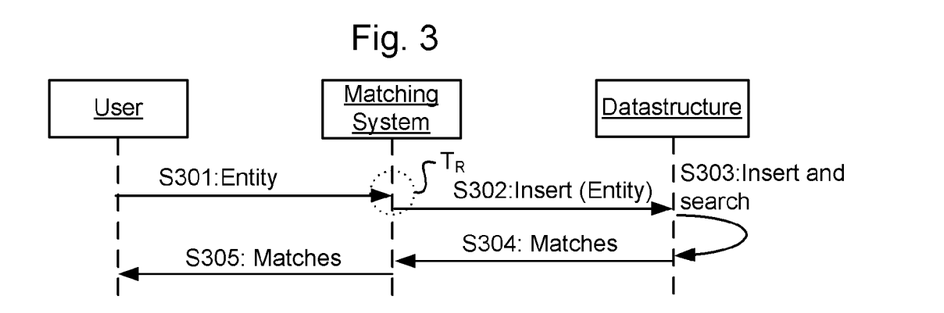
FIG. 3 illustrates an exemplary matching operation performed by the matching system in FIG. 1.

FIG. 3 shows an example of how a matching operation is performed by a matching system 1 according to the invention.

Here, a new entity sent from a client device is received by the matching system in step S301. The matching system is adapted to interpret the reception of a new entity as a match triggering event and hence initiate the search for matching entities directly upon reception of a new entity. That the search for matching entities is initiated directly upon reception of a new entity does not necessarily mean that no intervening actions are taken by the matching system between reception and search but merely that the reception triggers the matching system to perform a chain of operations of which the search operation is one. Thus, no other event than reception of a new entity has to occur in order for the matching system to initiate the search. The match triggering event is here seen to be illustrated with a dashed circle denoted $T_R$ (for "Triggered by Reception"). In this embodiment, the matching system initiates, in step S302, a combined insertion and search operation which will be discussed in greater detail below. Thus, in step S303, both insertion of the new entity into the data structure and search for entities matching the new entity are performed. In step S304 the matching entities are retrieved by the matching system and in step S305 the matching entities are sent to the client device of the user that uploaded the new entity to the matching system. By performing the search directly upon reception of a new entity, the matching system is continuously kept in a matched state.

Figure 4:
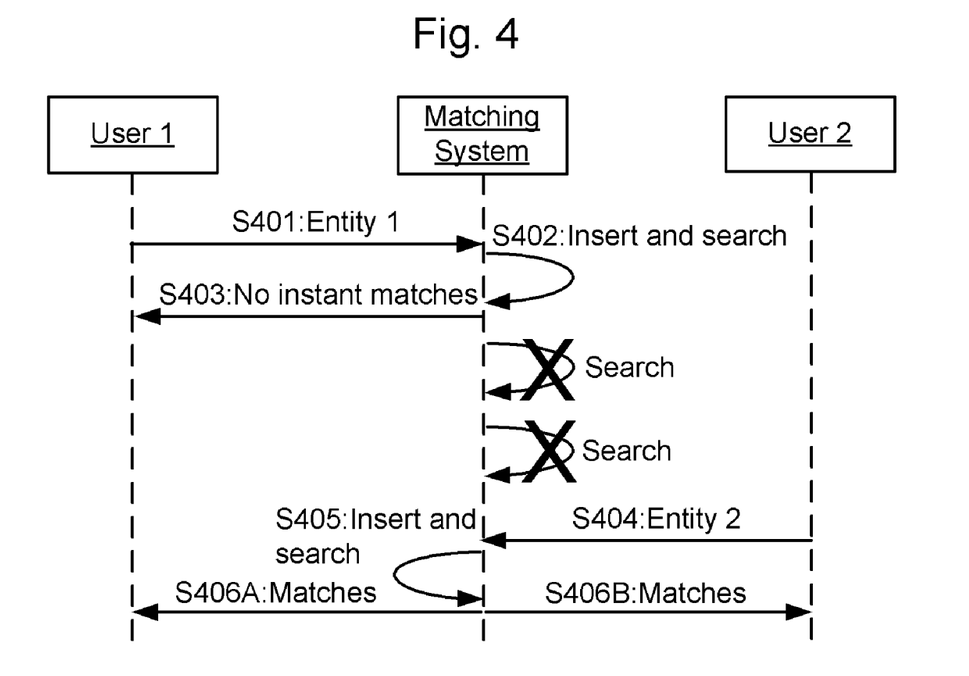
FIG. 4 shows a matching scenario illustrating one of the advantages achieved by the matching system in FIG. 1.

FIG. 4 shows a scenario illustrating one of the advantages achieved by a matching system adapted to initiate search for matching entities upon reception of a new entity. Here, in a first step S401, the matching system receives a first entity from the client device of a first user. In step S402, the matching system inserts the first entity into the data structure of the matching system by indexing and typically also storing the first entity, and searches for matching entities. As in the scenario illustrated in FIG. 2, insertion and search is performed in a common operation. In step S403, the matching system notifies the first user of the search result which in this exemplary scenario is seen to be negative. Now, if the matching system would have been a matching system according to prior art, redundancy searches may had been performed although no new entity had been submitted to the system, as illustrated by the crossed-out arrows illustrating search operations in the drawing. With the proposed matching operation, however, search will not be repeated until a new entity is received by the matching system, which is seen to occur in a step S404 in which a second entity is sent to the matching system from a client device of a second user. The reception of the second entity triggers a new search which is performed in step S405. In this exemplary scenario, the first entity is assumed to match the second entity, and, as a result, the matching system, in step S406A and S406B, notifies both the first and the second user that a match for their respective entity has been found by sending the second entity to the first user and the first entity to the second user. Thus, a matching system adapted to implement the suggested matching operation can save computational power since no redundancy searches are performed, and the users of the service for which the matching system is used do not have to worry about being uninformed about existing matches since they can be automatically notified as soon as a new entity matching their entity is submitted to the matching system.

Of course, the matching system does not have to send the matching entity itself to the respective user (i.e. the client device of the respective user) in steps S406A and S406B. The matching system could be adapted to send any information identifying the matching entity to the respective user. For example, if the matching system is used for an online dating service (in which case the entities may correspond to, e.g., user profiles or parts of user profiles of the people using the service) the information sent to the client devices of first user and the second user in steps S406A and S406B may be a URL (Uniform Resource Locator) to the matching user's "personal page" on the web site hosting the dating service. Or, if for example the first user is no longer logged in to the dating service when the match is found in step S405, the matching system can be adapted to, e.g., send the first entity to the second user while sending a URL to the personal page of the second user to the first user in an SMS message or an email along with information that a new match is found and can be viewed on the attached URL. According to another embodiment, the matching system is adapted not to send anything at all to the user devices of the first and the second user upon detection of the match in step S405. Instead, the matching system is adapted to store the matches in a database or a cache memory from which the matches can be retrieved and sent to the users the next time they log on to the service, in which case the matches may be displayed on the user's personal page, a "welcome screen", or the like.

Although insertion and search have been combined in a single operation performed in step S303 and steps S402 and S405, respectively, in the exemplary matching operations illustrated in FIGS. 3 and 4, it should be understood that the proposed matching operation in which search is initiated upon reception of a new entity may be performed by performing insertion and search in two separate sub-operations, as is done in the matching operation according to prior art as shown in FIG. 2 (step S203 and S206). As long as the search operation is triggered by the reception of a new entity and not by any other event, the matching system will be continuously kept in a matched state and benefit from the above discussed advantageous.

However, performing insertion and search in one single operation is advantageous in that it further reduces the computational power required by the matching system and/or reduces the time needed to perform the matching operation. A matching operation employing combined insertion and search will now be described with reference to FIG. 5.

Figure 5:
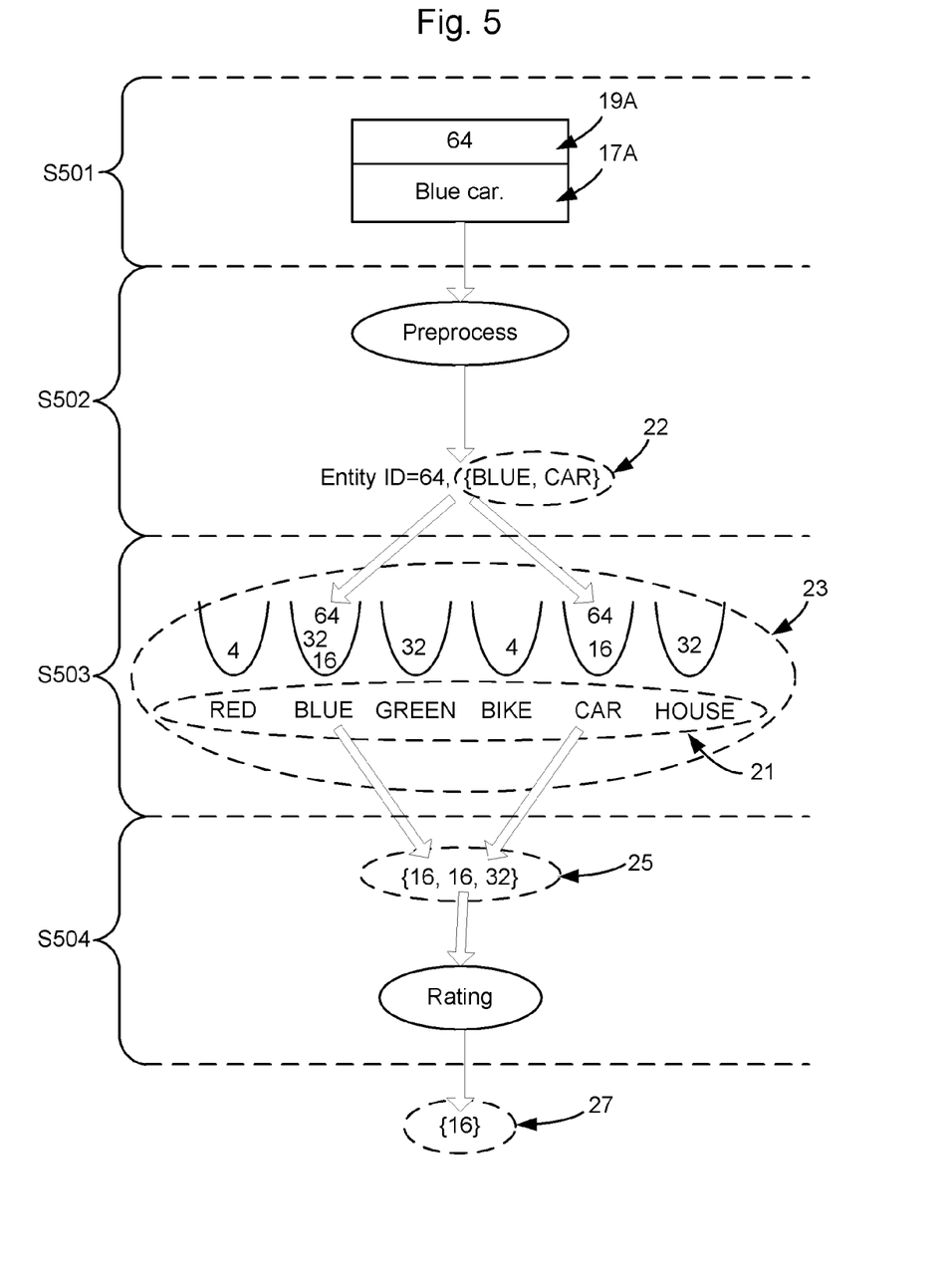
FIG. 5 illustrates schematically a more detailed example of how the matching operation illustrated in FIG. 3 can be performed.

FIG. 5 illustrates schematically a more detailed example of a matching operation according to the invention. When describing FIG. 5 simultaneous reference will be made to the matching system 1 in FIG. 1.

Step S501—Receiving and Storing a New Entity

The new entity 17A is received by the matching system 1 from one of the client devices 15A and 15B, respectively. The entity 17A is in this example a text string reading 'Blue car' and should thus be matched with other entities comprising the text string 'Blue car'. The matching system 1 stores the new entity 17A in the database 12 whereupon it is assigned an Entity ID 19A in form of an integer '64'.

Step S502—Pre-Processing the Entity

Before indexing the entity, the text string may need to be pre-processed. In this example, pre-processing is a very simple operation. The special character '.' at the end of the text string is removed, the text string is tokenized into a list 22 or sequence of words forming the text string, and all characters are put in capital letters. This is achieved by a part of the matching engine 7 which may be referred to as a preprocessor. Although being a simple operation in this example, pre-processing could be much more complex and involve features such as stemming and substitutions for synonyms. It may also involve the step of removing common words which carry very little information from a matching perspective, such as 'a', 'an', 'the', 'and', etc.

Step S503—Indexing the Entity and Search for Matching Entities

It is now time to index the new entity 17A. This is performed by associating the entity with one or several index points 21 in the index 23. The index 23 is here figuratively illustrated as comprising six "baskets", each belonging to an index point 21 of the index 23, which index points in this example correspond to the words occurring within the entities 17B stored in the entity storage 12. The numbers in each basket are the Entity IDs 19B of the entities 17B comprising the word to which the basket belong. The new entity 17A is indexed by associating it with the index points corresponding to the words 'blue' and 'car' in the list 22. This is illustrated by inserting the Entity ID 19A of the new entity 17A into these baskets. The other Entity IDs stored in these baskets are thus the Entity IDs of entities which can be said to match the new entity.

Normally, when having associated the new entity with all index points with which it is to be associated, matching systems according to prior art typically confirms that insertion of the new entity was successful and then return to "idle mode" until a match triggering event occurs. When a match triggering event occurs and the search for entities matching the new entity is to be performed, such a matching system according to prior art must then traverse the index 23 again to (figuratively speaking) find the baskets in which the Entity ID of the new entity is stored and retrieve all the other Entity IDs stored in the same baskets. According to an aspect of the invention, however, the Entity IDs of the matching entities are retrieved at the same time as the Entity ID 17A of the new entity 19A is inserted into the respective "basket". Since the index 23 has to be traversed to find the baskets into which the Entity ID 17A of the new entity 19A should be inserted, the retrieval of the Entity IDs of the matching entities is achieved at no extra cost.

In conclusion, the proposed principle makes indexation of the new entity 17A result also in retrieval of matching entities, or, in other words, it allows the indexation of an entity and the retrieval of entities matching that entity to be performed in one single traversal of the index 23. Of course, association of an entity with an index point is not performed by literally placing the Entity ID thereof in a "basket". An index can be designed in many different ways, as well known to persons skilled in the art, and the way the entities are associated with different index points depends on the type of index. The above described indexation and search operation is performed by a part of the matching engine 7 which may be referred to as a search engine.

Step S504—Rating the Matches

The result of the combined indexation and search operation performed in step S503 is a list 25 of Entity IDs identifying the matching entities. The list 25 can be said to represent the raw matching result for the new entity 17A. In some situations, such a list can be very extensive and before the matching result can be useful, the list 25 needs to be refined in a rating process. Rating is a way for the matching system 1 to sort out the important parts from the complete result set 25. Usually the least relevant matches are removed and the rest are ordered by relevance.

The most basic way to implement rating is to count the number of index points 21 the matched entity 17A has in common with each matching entity. In this exemplary case, the entity having the Entity ID '16' has two index points in common with the new entity 17A since '16' occurs two times in the list 25 while the entity having the Entity ID '32' and the new entity 17A only has one index point 21 in common. Thus, the matching system 1 can be adapted to rate the entity with Entity ID '16' higher than the one with Entity ID '32'.

Another simple and common way to implement rating is by using the so called inverse document frequency method. This method basically rate uncommon words higher than common words. The result is that two entities with an infrequent word in common are considered to be a better match than two entities having a frequently occurring word in common. This is a widespread method for rating in conventional search applications. In order to rate the relation between two entities with the inverse document frequency method, it is assumed that the in-common words of the two entities are known. It is also a prerequisite to know the total number of words in the system. The inverse document frequency can then be calculated for each word with the following formula:

$$w_t = \log_e\left(1 + \frac{N}{f_t}\right),$$

where
$w_t$ is the weight of the word, N is the total number of entities in the system, and $f_t$ is the number of entities in the system containing the word. This is of course not the optimal way of rating matches. A lot of improvements can be done to the rating in order to make it much more intelligent. This is, however, a good-enough solution in some cases. Another tricky task is how to determine what should be considered a match and what should not. This typically depends on the precision requirement of the matching system.

There are many ways known in the art for rating the matches found during a search. The two principles described above can be used separately or in combination with each other and/or in combination with other known rating principles to obtain a rating describing how good each entity identified by the Entity IDs in the raw matching result list 25 matches the new entity 17A. The matching system 1 is adapted to sort the list 25 based on the rating and to remove the least relevant matches. The above-described rating operation is performed by a part of the matching engine 7 which may be referred to as a match rater.

In this exemplary case, the result of the rating (the refined match result) is a "list" 27 that only contains the Entity ID '16'. At this point, the matching system 1 can be adapted to notify both the user that submitted the new entity 17A to the matching system and the user that submitted the old entity with Entity ID '16' that a match for their respective entities has been found. The matching system 1 can also be adapted to update some internal or external record which holds and keeps track of all matching entities stored by the matching systems 1.

It should thus be appreciated that although any entity that has at least one index point in common with the new entity 17A initially is considered by the matching system 1 to be a match of the new entity, many of these "matches" are typically dismissed as "non-matches" during the rating process. As mentioned above, the rating process can be very complex and use one or several rating functions to retrieve the relevant (refined) matches from the total (raw) set of matches. Preferably, the rating functions are chosen to be symmetric, or at least as symmetric as possible, meaning that if an "old" entity is considered to match the new entity, the new entity should also be considered to match the "old" entity.

Figure 6:
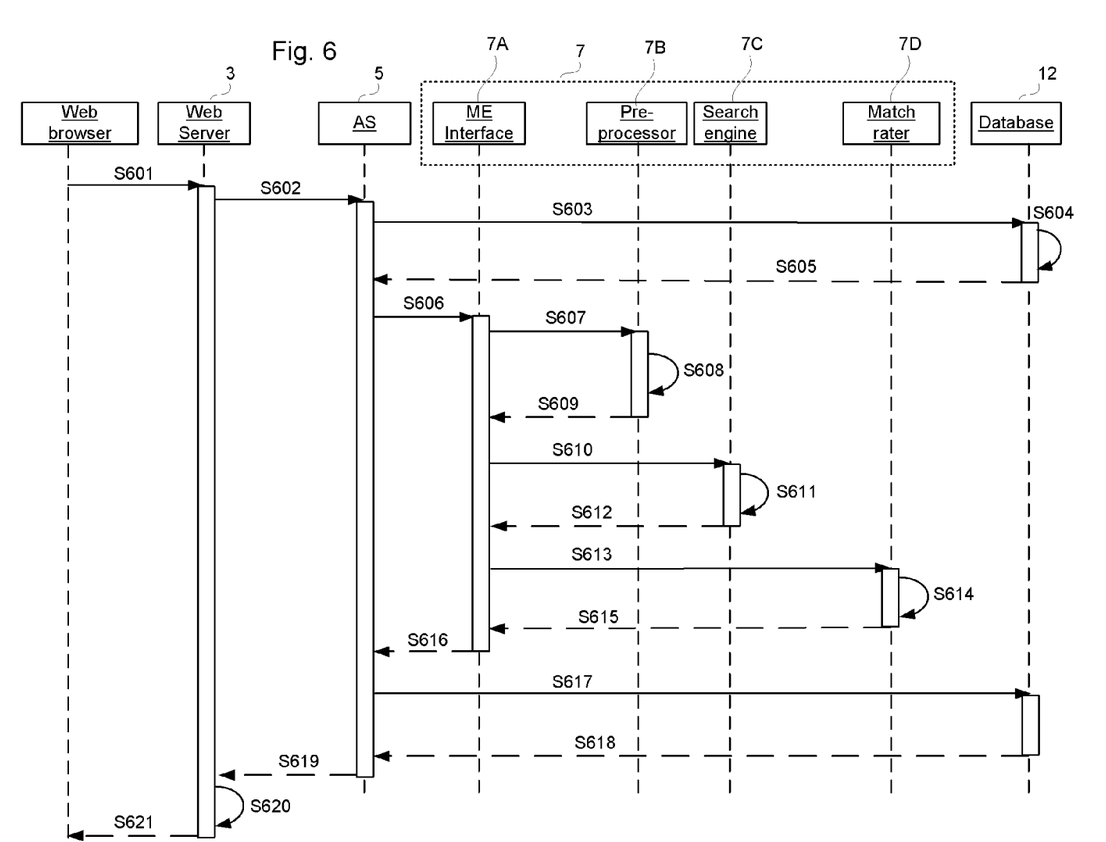
FIG. 6 illustrates a signaling scheme showing how the different components of the matching system in FIG. 1 can be arranged to communicate with each other during a matching operation as the one illustrated in FIG. 5.

FIG. 6 illustrates a signaling scheme showing how the different components of the matching system 1 in FIG. 1 may be adapted to communicate with each other during a matching operation. When describing the signaling scheme, simultaneous reference will be made to the matching system in FIG. 1.

Step S601: A HTTP POST request containing a post parameter containing a text string is sent from the Web Browser of the client device 15A, 15B to the web server 3 of the matching system 1. Depending on the type of matching service for which the matching system 1 is used, the text string may be, e.g., a user profile for a dating service, a commercial ad for an e-commerce service, a CV for a recruitment/job-finding service, or anything else that the matching system 1 should match.

Step S602: The web server 3 forwards the post-parameter as a String parameter in a method call to the application server 5 of the matching system.

Step S603: The application server 5 sends the String to the database 12.

Step S604: The database 12 stores the String as an entity 17A and generates an Entity ID 19A for the entity.

Step S605: The Entity ID is returned to the application server 5.

Step S606: The application server 5 calls the matching engine 7 with the entity content (in this case the text string) and the Entity ID. Here, the matching engine 7 comprises a matching engine (ME) interface 7A for handling internal and external communication. This step is thus the step in which the application server 5 calls the matching engine 7 to initiate the search for entities matching the new entity received in step S602 (which search in this exemplary embodiment is performed during indexation of the new entity). The method call made by the application server 5 to the matching engine 7 is triggered by the reception of the new entity in step S602, meaning that the reception of the entity in step S602 triggers a chain of operations to be performed by the matching system 1, of which one operation is the search for entities matching the newly received entity.

Step S607: The matching engine interface 7A calls the preprocessor 7B of the matching engine 7 with the entity content for pre-processing the content.

Step S608: The preprocessor processes the entity content. As mentioned above, preprocessing may be a complex operation. When dealing with text entities, one of the most important parts of this step is segmentation/tokenization of the text into words.

Step S609: The preprocessor 7B returns an array of strings, each corresponding to a word from the entity content. The array of strings/words thus corresponds to the list 22 in FIG. 5.

Step S610: The matching engine 7 interface 7A calls the search engine 7C with the word array received from the preprocessor 7B in the previous step and the Entity ID of the new entity 17A.

Step S611: The search engine 7C indexes the word array and retrieves all potential matching entities.

Step S612: The search engine 7C returns a raw matching result list (corresponding to list 25 in FIG. 5) that has an entry for each word within the word array submitted to the search engine in step S610. For each word, a sub-list (corresponding to the "lists" {16}, {16, 32} in the list denoted 25 in FIG. 5) with the Entity IDs for all entities matching that word is attached to the raw matching result list.

Step S613: The last step performed by the matching engine 7 is to rate the result obtained by the search engine 7C. The raw matching result list returned from the search engine 7C in the previous step is therefore forwarded to the match rater 7D of the matching engine 7.

Step S614: The match rater 7D calculates a rating for each entity in the raw matching result list. If the rating is too low, the entity is not considered a match anymore and is removed from the list. The match rater then typically removes any Entity ID duplicates in the list of remaining matches and sorts the remaining matches based on rating. The result is a refined matching result list, such as the list denoted 27 in FIG. 5.

Step S615: The match rater 7D returns the refined matching result list. This list may be a list of the Entity IDs of the matching entities, sorted based on rating, or it may be a list of Entity ID and rating parameter pairs such that the rating for each matching entity is returned and can be used later in the process.

Step S616: The matching engine 7 interface 7A returns the refined matching result list to the application server 5.

Step S617: The application server calls the database 12 with the Entity IDs comprised in the refined matching result list.

Step S618: The database 12 returns a list with the entities of which Entity IDs were comprised in the refined matching result list, i.e. a list of all matching entities.

Step S619: The application server 5 returns the list of all matching entities to the web server 3, additionally together with the rating of each entity.

Step S620: The web server 3 builds an XHTML/HTML document presenting the result (i.e. presenting the matching entities and additionally the rating of each entity).

Step S621: The XHTML/HTML document is sent in a HTTP response to the web browser of the client device 13A, 13B from which the HTTP POST request in step S601 originated.

Figure 7:
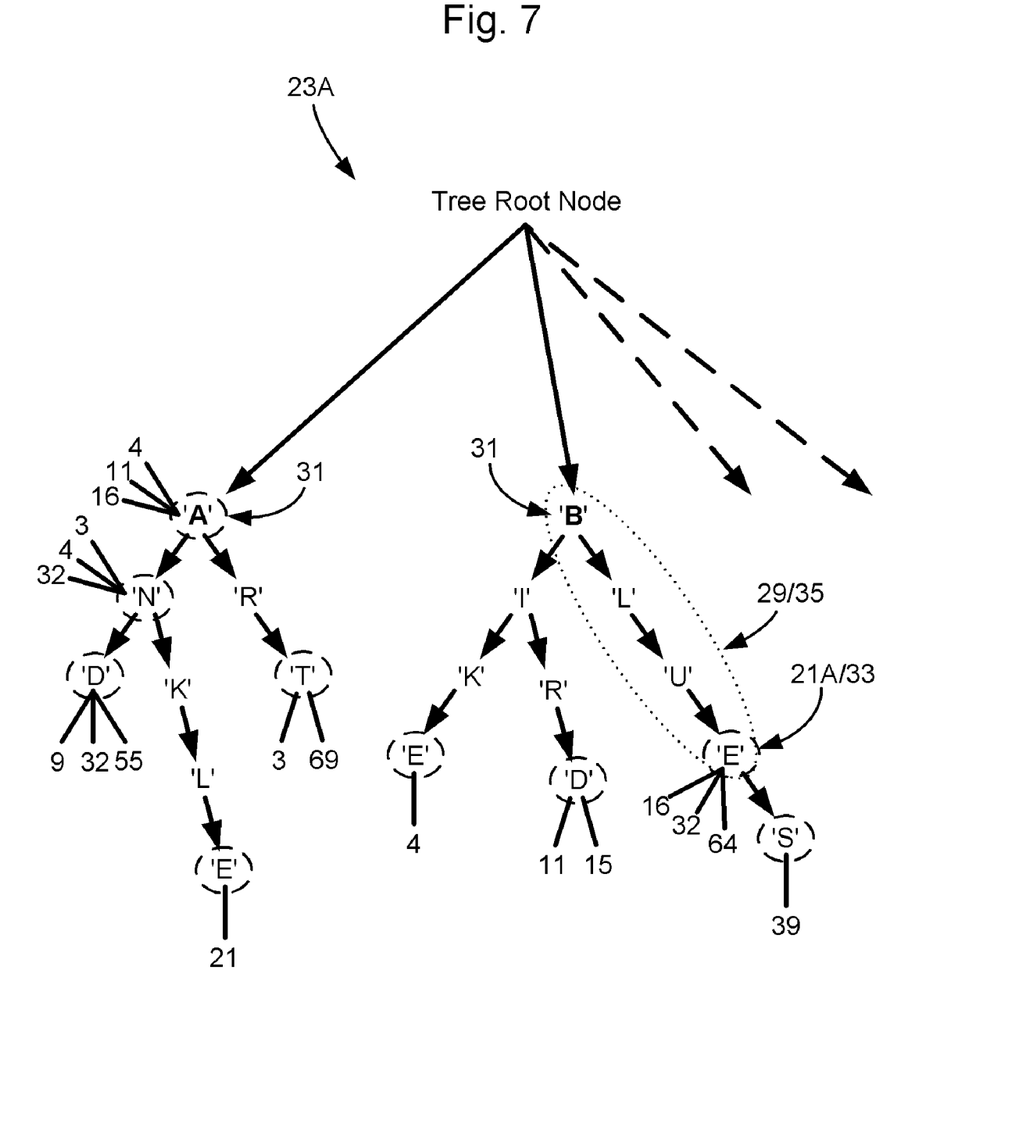
FIG. 7 illustrates an exemplary index data structure which may be used for the index of the matching system in FIG. 1.

FIG. 7 illustrates figuratively a way in which data in the matching engine index 23 in the matching system 1 according to the invention can be structured. Also in this exemplary case, the entities that are to be matched by the matching system 1 are assumed to be text strings. The index data is here seen to be structured in an ordered tree data structure which, as aforementioned, sometimes is referred to as a "trie". The matching engine index 23 can therefore, in this exemplary case, be said to be a trie or tree-type index 23A. The sequence of characters 29 forming a word occurring within any of the text entities form a branch or part of a branch 35 between a branch root node 31 and a word-end node 33. Using computer science terminology, the sequence of characters 29 can be said to constitute an associative char array. Each branch root node 31 is a child node of the root node of the tree structure (the tree root node) and corresponds to a unique character or number. For illustrative purposes, only two branch root nodes 31 (corresponding to the characters 'A' and 'B') and some exemplary words assumed to occur within the entities of the system are illustrated in the drawing. All word-end nodes 33 in the drawing are indicated by dashed ellipses and each word-end node is an index point 21A in the tree-type index 23A since each index point/word-end node 21/33 is associated with all entities comprising the word formed by the sequence of characters 29 from the branch root node 31 to that word-end node 33. That is, although the index points 21 in the tree-type index 23A are single-character nodes 33, each index point 21 corresponds to the word formed by the branch or part of branch 29 ending in that node 33. A tree-type index 23A having its data ordered according to a logical tree structure is advantageous compared to indices storing all unique words occurring within the entities in their entirety in that the number of characters that has to be stored, and thus the required memory space of the system, is reduced. The tree-type index 23A can be stored in e.g. an index database or the cache memory of a node, such as the application server 5 of the matching system. The tree-type index 23A is typically stored by storing each node of the tree structure along with pointers pointing to all child nodes of that node, or, in other words, each node is stored such that it is associated with a child list comprising all child nodes of that node.

Of course, the above described principle of structuring index data according to a tree structure is applicable also for numbers and any other pieces of information that are formed by an associative sequence of symbols. Thus, the tree structure could, for example, comprise branches that are formed by sequences of digits, or, using computer science terminology, associative integer arrays, which are associatively ordered between a branch root node corresponding to the first digit in the number and a number-end node corresponding to the last digit in the number. In analogy to the word-based case, a text entity comprising a number corresponding to the number formed between such a branch root node and number-end node would then be associated with the number-end node which hence would be an index point of the tree-type index 23A. Since the sequence of symbols does not have to form a word or number, the term sequence-end node 33 may be used for a word-end node, a number end-node, or any other tree-type index node corresponding to the last symbol in a sequence of symbols found within an entity.

Figure 8:
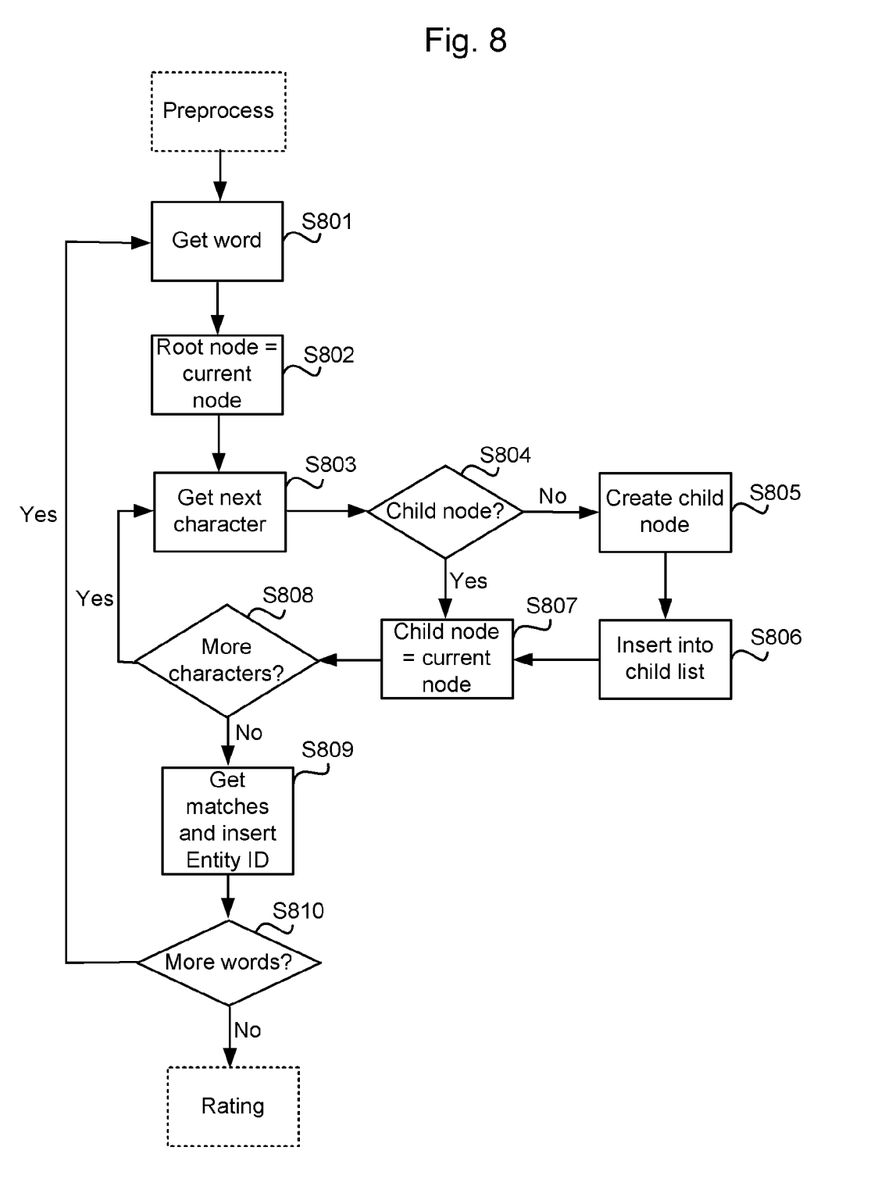
FIG. 8 shows a flow chart diagram illustrating how a combined search and indexation operation can be performed by the matching system in FIG. 1 when using an index in which the data is structured as illustrated in FIG. 7.

FIG. 8 shows a flow chart diagram illustrating how a combined search and indexation operation can be performed for a new entity, such as the entity 17A in FIGS. 1 and 5, when the index 23 of the matching system 1 is a tree-type index, such as the tree-type index denoted 23A in FIG. 7.

Again, the entities are assumed to be text strings and the new entity 17A is assumed to be preprocessed by a preprocessor 7B of the matching engine 7 such that the text string is tokenized into a sequence of words 22 forming the text. The method steps illustrated in the flow chart diagram are typically performed by the part of the matching engine 7 that is herein referred to as the search engine 7C.

Step S801: The first word in the text string is retrieved.

Step S802: The "currently processed node" of the tree structure is set to the tree root node.

Step S803: The next character of the word is retrieved.

Step S804: A check whether the current node has a child node is performed. If a child node of the current node exists the method proceeds to step S807, if not the method proceeds to step S805.

Step S805: A child node corresponding to the currently processed character is created.

Step S806: The child node is stored in the child list of the parent node.

Step S807: The "currently processed node" of the tree structure is set to the child node.

Step S808: A check whether the currently processed word comprises more characters is performed. If there are more characters in the word, the method returns to step S803, if not the method proceeds to step S809.

Step S809: The Entity ID 19A of the new entity 17A is inserted into the currently processed node, which hence is a word-end node 33 since the currently processed character is the last character of the currently processed word. That the Entity ID 19A is inserted into the currently processed node means that the Entity ID 19A of the new entity 17A is stored in the index storage (database or cache memory) in a way that associates it with currently processed node. At the same time, all other Entity IDs (if any) associated with that node is retrieved from the index storage. If not already associated with one or several entities, the currently processed node thus, at this stage, becomes an index point 21A by associating it with the new entity 17A.

Step S810: A check whether the text string comprises more words than the currently processed word is performed. If there are more words in the text string, the method returns to step S801, if not the method ends and the Entity IDs retrieved in step S809 (for each word in the text string) may be forwarded to the match rater 7D of the matching engine 7 as described with reference to FIG. 6.

Figure 9:
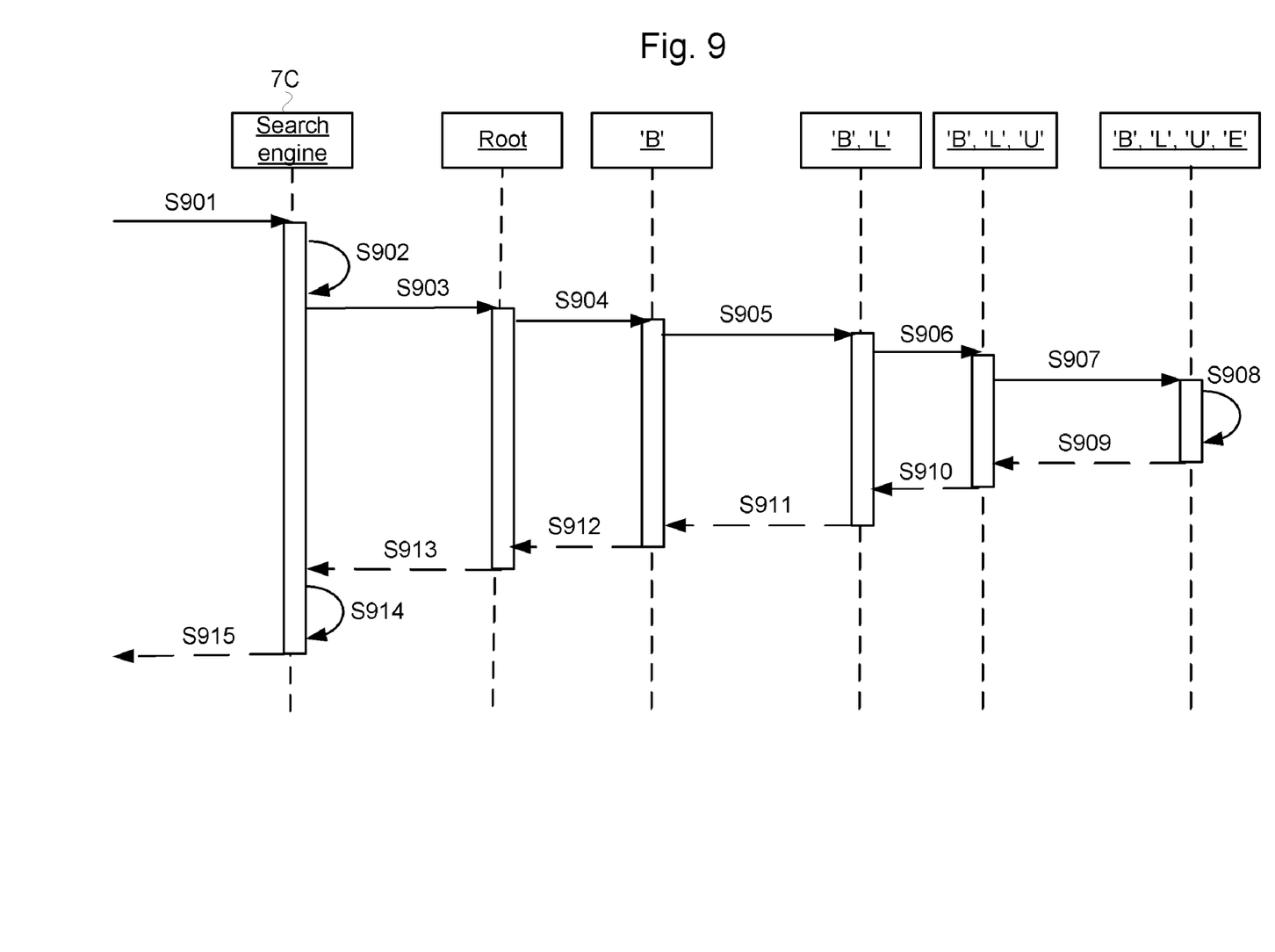
FIG. 9 shows a signaling scheme illustrating how a combined search and indexation operation can be performed by the matching system when using an index in which the data is structured as illustrated in FIG. 7.

FIG. 9 shows a signaling scheme illustrating the sub-steps performed by the search engine 7C in step S611 in FIG. 6 when the index 23 of the matching system is a tree-type index, such as the tree-type index denoted 23A in FIG. 7.

Again, the new entity is assumed to be the entity 17A in FIGS. 1 and 5, thus being a text string reading 'blue car.'. It is also assumed that the preprocessor 7B (see FIG. 6) has removed the special character '.' and tokenized the text string into a list 22 of words.

Step 901: The indexation and search operation performed by the search engine 7C is called with the Entity ID 19A of the new entity 17A and an array of strings 22 ({'blue', 'car'}) wherein each string corresponds to a word in the text string.

The steps denoted S902-S913 following hereinafter are performed for each string in the string array 22, i.e., in this example, for the strings 'blue' and 'car'.

Step S902: The string/word is tokenized into an array of characters, e.g. {'b', 'l', 'u', 'e'}.

Step S903: The newly created array of characters is sent further to the index 23, 23A together with the Entity ID 19A of the new entity 17A.

Steps S904-S907: The index 23, 23A is traversed based on the array of characters. Any node corresponding to the sequence of characters and not previously existing in the tree structure is created and stored as illustrated by steps S805-S806 in FIG. 8.

Step S908: The Entity ID 19A of the new entity 17A is stored in the word-end node 33 corresponding to the character 'e' which thus becomes an index point 21A of the new entity 17A. At the same time, any Entity ID previously stored in that node 33 and thus being an Entity ID of an entity matching the new entity 17A is retrieved.

Steps S909-S913: A list comprising the Entity IDs retrieved in step S908 is returned recursively to the search engine 7C via the nodes of the tree structure.

Step S914: The lists of the Entity IDs retrieved in step S908 for all words of the new text entity 17A are combined into an aggregated list corresponding to the raw matching result list 25 in FIG. 5. Thus, in this exemplary case, the aggregated list will contain the Entity IDs of all entities comprising the words 'blue' and 'car'.

Step S915: The aggregated list created in step S914 is returned. Typically, as illustrated in FIG. 6, the search engine 7C now calls the match rater 7D with the aggregated list as input parameter.

The principle described herein for performing the indexation of a new entity and the search for entities matching the new entity in one single operation is applicable in any type of matching system using an index 23, 23A in which each index point 21, 21A can be associated with a plurality of entities 17A, 17B. Most preferably, each index point 21, 21A should be associated with all entities having the property to which the index point corresponds so that all entities having that property are retrieved when the new entity is associated with that index point.

In the above examples, the entities 17A, 17B are text strings and each index point 21, 21A of the index 23, 23A corresponds to a word occurring within any of the text strings. Thus, the index points 21, 21A can in these examples be said to correspond to a "semantic property" of the entities that are to be matched, e.g. the property of comprising the word 'blue'. However, it should be appreciated that the index can reflect any possible entity property. For example, in the case in which the entities are text strings, the matching system 1 may be adapted to count the number of characters in each entity, and the index may comprise index points corresponding to a character number or a character number interval. Also, the matching system 1 can comprise logic for analyzing the textual context of the entities whereupon the index points of the index may correspond to words or phrases describing the textual context of the entities. The index 23, 23A can, of course, also comprise combinations of these types of index points.

Furthermore, although the index 23, 23A typically is adapted to index the entities by reflecting their properties in words, the entities themselves do not need to comprise words. For example, the matching system 1 can be used for picture matching services or audio track matching services in which case the entities sent from the client devices 13A, 13B are pictures and audio tracks, respectively. When used for picture matching, the matching system 1 can comprise image recognition software for transforming the "visual properties" of the images (given by the data of the digital image files constituting the entities) to words or numbers which can constitute index points in the index 23, 23A. For example, the image recognition software can comprise functionality for determining what objects are depicted in an image, for example by analyzing the shape of the objects in the image and compare the shapes with pre-stored shapes, each associated with a word describing that shape in a look-up table. Also, it could be adapted to determine the most conspicuous colour of the image or a particular object in the image by digital colour analysis. Thereby, the image recognition software would be able to analyze an image and determine, e.g., that the image depicts a blue car. In this case, the image recognition software could provide the matching engine 7 with a text string reading 'blue car', or an already segmented text string, such as the string array 22 in FIG. 5, reading {'blue', 'car'}, whereupon the matching engine 7 could associate the image entity with index points corresponding to the words 'blue' and 'car' in the index 23, 23A as previously described. Thus, in this case, the words in the index 23, 23A would not correspond to words occurring within the entities but to words that are descriptive of the entities by reflecting other entity properties. In a similar way, the matching system 1 could be used for matching audio tracks in which case the matching system can comprise software for analyzing an audio track using waveform recognition technology and/or by analyzing textual information that may be embedded in the audio file data content of the audio files submitted to the system. The properties of the audio tracks can then be transformed to words or numbers describing these properties (e.g. the title of a song and the name of the artist, the number of beats per minute for an audio track, the genre of a music track, etc.) whereupon the audio tracks can be associated with index points corresponding to these properties in the index 23, 23A. The matching system 1 can also be communicatively connected to external nodes adapted to transform the properties of the entities to words or numbers which can be used as index points. For example, the matching system 1 can be connected to the Gracenote® server which is a server for "transforming" a music track (i.e. a song) sample to the title of the song and the name of the artist performing it.

It should thus be appreciated that the sequences of symbols, such as words or numbers, corresponding to index points 21, 21A in the matching engine index 23, 23A do not have to correspond to sequences of symbols found in text entities received by the matching system 1 but may be any sequences of symbols (i.e. words and/or numbers) that are descriptive of any type of entity or entity property.

The invention claimed is:

1. A matching system configured to determine if a first entity received from a client device of a first user matches with at least one other entity of a plurality of entities indexed in an index in which each entity is associated with one or more index points, the system comprising:
    an application server adapted for communication with a matching engine and the client device, the matching engine being configured to:
        index the first entity by associating the first entity with one or more index points in the index; and
        search for other entities matching the first entity among the plurality of entities indexed in the index by searching for other entities associated with at least one of the index points with which the first entity is associated;
    wherein the matching system is adapted to initiate the search for other entities matching the first entity upon occurrence of a match triggering event; and
    wherein the matching system is adapted to interpret the reception of the first entity as a match triggering event such that search is initiated upon reception thereof.

2. The matching system of claim 1, wherein the matching engine is configured to associate the first entity with each index point and retrieve information identifying other entities that are associated with each index point associated with the first entity, thereby indexing the first entity and identifying entities matching the first entity in a single traversal of the index.

3. The matching system of claim 2, wherein the entities comprise words and the index comprises index points each corresponding to a word and being associated with entities including the corresponding word, the matching engine being configured to:
    add a new index point to the index corresponding to each word occurring within the first entity that has no corresponding index point in the index and associate the first entity with the new index point, and;
    associate the first entity with the index point for each word occurring within the first entity and having a corresponding index point the index and retrieve information identifying other entities associated therewith.

4. The matching system of claim 3:
    wherein the index is a tree-type index in which the words to which the index points correspond are tokenized into sequences of characters forming the words; and
    wherein the sequences of characters are structured according to an ordered tree structure in which the first character in each sequence is associated with a branch root node and each subsequent character is associated with a child node of the node with which the preceding character is associated, such that the characters of each word forms a branch or part of a branch between the branch root node and a word-end node, the index points of the tree-type index correspond to the word-end nodes of the tree structure and each index point is associated with all entities comprising the word formed by the sequence of characters between that index point and the branch root node, the matching engine being configured to:
    tokenize each word within the first entity into a sequence of characters and match the sequence of characters with existing branches or parts of branches in the tree structure, and;
    create a new branch or add child node(s) to an existing branch for each word for which no matching sequence of characters is found, such that the branch corresponds to the sequence of characters of the word and create a new index point by associating the first entity with the leaf node of the branch, and; and
    associate the first entity with the index point of the matching sequence of characters for each word for which a matching sequence of characters is found and retrieve information identifying the other entities associated therewith.

5. The matching system of claim 1:
    wherein the matching engine comprises match rating means; and
    wherein when the matching engine finds a plurality of entities that are associated with at least one index point with which the first entity is associated, the match rating means is adapted to rate the plurality of entities based on at least one criteria of which one is the number of index points each of the plurality of entities has in common with the first entity.

6. The matching system according of claim 5:
wherein the retrieved information identifying the entities associated with each index point is a list of entity identification parameters identifying all entities associated with that index point;
wherein the matching engine is adapted to arrange all entity identification parameters retrieved for all index points in a list; and
wherein the match rating means is adapted to rate the matching entities based on how many times the entity identification parameter of each entity occurs in the list.

7. The matching system of claim 1, wherein the application server, when at least one matching entity is found during the search, is adapted to send information identifying the at least one matching entity to the client device of the first user in response to the match triggering event.

8. The matching system of claim 1, wherein the application server, when at least one matching entity which previously was sent to the application server from a client device of a second user is found during the search, is adapted to send information identifying the first entity to the client device of the second user in response to the match triggering event.

9. A method for determining if a first entity received from a client device of a first user matches at least one other entity of a plurality of entities indexed in an index in which each entity is associated with one or more index points, the method comprising:
receiving, in a server node, the first entity;
indexing the first entity by associating the first entity with one or more index points in the index;
searching for other entities matching the first entity among the plurality of entities indexed in the index by searching for other entities associated with at least one of the index points with which the first entity is associated, the search for other entities matching the first entity being initiated upon occurrence of a match triggering event; and
interpreting the reception of the first entity as a match triggering event, thereby initiating the search upon reception of the first entity.

10. The method of claim 9, wherein searching for other entities matching the first entity and indexing the first entity for each index point with which the first entity is to be associated comprise:
associating the first entity with that index point; and
retrieving information identifying other entities that are associated with that index point, thereby indexing the first entity and identifying other entities matching the first entity in one single traversal of the index.

11. The method of claim 10, wherein the entities comprise words and the index comprises index points each corresponding to a word and being associated with entities comprising corresponding word, the method further comprising:
for each word occurring within the first entity and for which no corresponding index point exists in the index:
adding a new index point corresponding to that word to the index, and
associating the first entity with the new index point;
for each word occurring within the first entity and for which a corresponding index point already exists in the index, associating the first entity with that index point, and retrieving information identifying other entities associated therewith.

12. The method of claim 11:
wherein the index is a tree-type index in which the words to which the index points correspond are tokenized into sequences of characters forming the words; and
wherein the sequences of characters are structured according to an ordered tree structure in which the first character in each sequence is associated with a branch root node and each subsequent character is associated with a child node of the node with which the preceding character is associated, such that the characters of each word forms a branch or part of a branch between the branch root node and a word-end node, the index points of the tree-type index correspond to the word-end nodes of the tree structure and each index point is associated with all entities comprising the word formed by the sequence of characters between that index point and the branch root node, the method further comprising:
tokenizing each word within the first entity into a sequence of characters;
matching the sequence of characters with existing branches or parts of branches in the tree structure;
for each word for which no matching sequence of characters is found:
creating a new branch or add child node(s) to an existing branch such that the so formed branch corresponds to the sequence of characters of the word;
creating a new index point by associating the first entity with the leaf node of the so formed branch;
for each word for which a matching sequence of characters is found:
associating the first entity with the index point of the matching sequence of characters, and
retrieving information identifying the other entities associated therewith.

13. The method of claim 9 wherein when a plurality of entities that are associated with at least one index point with which the first entity is associated are found during the search for matching entities, the method further comprises:
rating the plurality of entities based on at least one criteria of which one is the number of index points each of the plurality of entities has in common with the first entity.

14. The method of claim 13, wherein the retrieved information identifying the entities associated with each index point is a list of entity identification parameters identifying all entities associated with that index point, the method further comprising:
arranging all entity identification parameters retrieved for all index points in a list, and
rating the matching entities based on how many times the entity identification parameter of each entity occurs in the list.

15. The method of claim 1 wherein when at least one matching entity is found during the search, the method further comprises sending information identifying the at least one matching entity to the client device of the first user in response to the match triggering event.

16. The method of claim 9 wherein when at least one matching entity which previously was received by the server node from a client device of a second user is found during the search, the method further comprises sending information identifying the first entity to the client device of the second user in response to the match triggering event.

17. A computer program comprising computer readable code means which when run on a server computer causes the server computer to determine if a first entity received from a client device of a first user matches with at least one other entity of a plurality of entities indexed in an index in which each entity is associated with one or more index points by making the server computer perform the following:

indexing the first entity by associating the first entity with one or more index points in the index; and     searching for other entities matching the first entity among the plurality of entities indexed in the index by searching for other entities associated with at least one of the index points with which the first entity is associated;

wherein the search for other entities matching the first entity is initiated upon occurrence of a match triggering event; wherein the computer program is adapted to cause the server computer to interpret the reception of the first entity as a match triggering event, thereby initiating the search upon reception of the first entity.

18. The computer program of claim 17, the computer program being configured to cause the server computer to perform indexation and search such that, for each index point with which the first entity is to be associated, the server computer associates the first entity with that index point and retrieves information identifying other entities that are associated with that index point, thereby indexing the first entity and identifying entities matching the first entity in one single traversal of the index.

\* \* \* \* \*

UNITED STATES PATENT AND TRADEMARK OFFICE
CERTIFICATE OF CORRECTION

| | | |
|---|---|---|
| PATENT NO. | : 8,224,809 B2 | Page 1 of 1 |
| APPLICATION NO. | : 13/132201 | |
| DATED | : July 17, 2012 | |
| INVENTOR(S) | : Carlsson et al. | |

It is certified that error appears in the above-identified patent and that said Letters Patent is hereby corrected as shown below:

On the Title Page, Item (56), under "Other Publications", in Column 2, Line 9, delete "anagement," and insert -- Management --, therefor.

In the Specification:

In Column 13, Lines 67, delete "'blue car.'." and insert -- 'blue car'. --, therefor.

In the Claims:

In Column 16, Line 57, in Claim 4, delete "and; and" and insert -- and --, therefor.

In Column 17, Line 6, in Claim 6, delete "according of" and insert -- of --, therefor.

Signed and Sealed this
Eighteenth Day of December, 2012

David J. Kappos
*Director of the United States Patent and Trademark Office*